(12) United States Patent
Peng et al.

(10) Patent No.: US 9,396,748 B2
(45) Date of Patent: *Jul. 19, 2016

(54) PEG HEIGHT OF NEAR-FIELD TRANSDUCERS

(71) Applicant: Seagate Technology LLC, Cupertino, CA (US)

(72) Inventors: Chubing Peng, Eden Prairie, MN (US); Nils Gokemeijer, Edina, MN (US); Yuhang Cheng, Edina, MN (US); Kaspar Ko, Minneapolis, MN (US); Amit Sharma, Eden Prairie, MN (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/624,066

(22) Filed: Feb. 17, 2015

(65) Prior Publication Data

US 2015/0187378 A1    Jul. 2, 2015

Related U.S. Application Data

(62) Division of application No. 14/016,441, filed on Sep. 3, 2013, now Pat. No. 8,958,271.

(51) Int. Cl.
*G11B 5/48* (2006.01)
*G11B 13/08* (2006.01)
(Continued)

(52) U.S. Cl.
CPC ............. *G11B 5/4866* (2013.01); *G11B 5/314* (2013.01); *G11B 5/6088* (2013.01); *G11B 13/08* (2013.01); *G11B 2005/0021* (2013.01)

(58) Field of Classification Search
CPC ................. G11B 5/4866; G11B 2005/0021; G11B 5/314; G11B 5/6088; G11B 2005/001; G11B 7/1387; G11B 5/3116; G11B 13/045; G11B 11/10554; G11B 11/1058; G11B 5/3133; G11B 13/08; G11B 7/1384
USPC ............................. 369/13.33, 13.13, 112.27
See application file for complete search history.

(56) References Cited

U.S. PATENT DOCUMENTS 6,429,968 B1   8/2002   Carver
7,996,986 B2   8/2011   Gokemeijer
(Continued)

OTHER PUBLICATIONS

Peng, "Surface-plasmon resonance of a planar lollipop near-field transducer", Applied Physics Letters, vol. 94 (171106), 2009, pp. 1-3.
(Continued)

*Primary Examiner* — Ali Neyzari
(74) *Attorney, Agent, or Firm* — Hollingsworth Davis, LLC

(57) ABSTRACT

A method is provided for characterizing the peg region of a near-field transducer incorporated into a write head of a HAMR magnetic recorder. The method includes providing excitation radiation to one or more near-field transducers. The near-field transducers include an enlarged disk region and a peg region at least partially in contact with the enlarged disk region. The method further includes filtering output radiation from the near-field transducers by passing a portion of photoluminescent radiation emitted by the near-field transducers in response to the excitation radiation and substantially blocking the excitation radiation transmitted by the near-field transducers. The method also includes detecting the portion of photoluminescent radiation and characterizing the peg region of at least one of the plurality of near-field transducers.

20 Claims, 19 Drawing Sheets

(51) Int. Cl.
*G11B 5/31* (2006.01)
*G11B 5/60* (2006.01)
*G11B 5/00* (2006.01)

(56) References Cited

U.S. PATENT DOCUMENTS

| | | | |
|---|---|---|---|
| 8,149,653 B2 | 4/2012 | Shimazawa et al. | |
| 8,243,561 B2 | 8/2012 | Matsumoto | |
| 8,369,191 B2 | 2/2013 | Shimazawa et al. | |
| 8,375,565 B2 | 2/2013 | Hu et al. | |
| 8,391,107 B2 | 3/2013 | Gage et al. | |
| 8,391,108 B2 * | 3/2013 | Peng | G11B 5/314 369/112.27 |
| 8,406,090 B2 | 3/2013 | Juang et al. | |
| 8,411,393 B2 | 4/2013 | Zou et al. | |
| 8,432,781 B2 | 4/2013 | Knappmann et al. | |
| 8,451,555 B2 | 5/2013 | Seigler et al. | |
| 8,451,705 B2 | 5/2013 | Peng et al. | |
| 8,593,914 B2 | 11/2013 | Wang et al. | |
| 8,681,333 B2 | 3/2014 | Peng | |
| 8,711,662 B2 | 4/2014 | Lee et al. | |
| 8,958,271 B1 | 2/2015 | Peng et al. | |
| 2009/0225464 A1 | 9/2009 | Juang et al. | |
| 2011/0216635 A1 | 9/2011 | Masumoto | |
| 2011/0228651 A1 | 9/2011 | Gage et al. | |
| 2011/0228652 A1 | 9/2011 | Gage et al. | |
| 2011/0228653 A1 | 9/2011 | Shimazawa et al. | |
| 2011/0299080 A1 | 12/2011 | Peng | |
| 2012/0134246 A1 | 5/2012 | Shimazawa | |
| 2012/0163137 A1 | 6/2012 | Wang et al. | |
| 2012/0257488 A1 | 10/2012 | Knappmann et al. | |
| 2012/0314549 A1 | 12/2012 | Lee et al. | |
| 2013/0135975 A1 | 5/2013 | Gage et al. | |
| 2013/0277575 A1 | 10/2013 | Peng et al. | |
| 2015/0036137 A1 | 2/2015 | Peng et al. | |
| 2015/0043315 A1 * | 2/2015 | Chen | G11B 5/6088 369/13.33 |
| 2015/0131415 A1 * | 5/2015 | Peng | G11B 5/4866 369/13.32 |
| 2015/0187378 A1 * | 7/2015 | Peng | G11B 5/4866 369/13.33 |

OTHER PUBLICATIONS

Muhlschlegel et al., "Resonant Optical Antennas", Science, vol. 308 (5728), Jun. 2005, pp. 1607-1609.

File History for U.S. Appl. No. 14/016,441.

* cited by examiner

PEG HEIGHT OF NEAR-FIELD TRANSDUCERS

CROSS-REFERENCE TO RELATED APPLICATIONS

This application is a divisional of U.S. Ser. No. 14/016,441, filed Sep. 3, 2013, which is incorporated herein by reference in its entirety.

SUMMARY

Some embodiments include a method for characterizing a peg region of a near-field transducer with regard to peg height. Excitation radiation is emitted from an excitation light source through an optical input coupler to a plurality of near-field transducers (NFTs). The NFTs include an enlarged region and a peg region at least partially in contact with the enlarged region. The output radiation from the NFTs is filtered using a short wavelength pass optical filter. Filtering involves passing a portion of photoluminescent radiation emitted by the NFTs in response to the excitation radiation and substantially blocking the excitation radiation. The portion of photoluminescent radiation emitted by the NFTs is detected and an electrical signal is generated in response to detection of the photoluminescent radiation. The peg region of an NFT is characterized based on the electrical signal. Characterization of the peg region can include determining peg height, determining if the peg height meets a predetermined height and/or determining if the peg height provides an acceptable NFT response. In some embodiments, the plurality of NFTs is part of a wafer bar that includes at least two NFTs that have different peg heights.

Some embodiments are directed to a system that includes an excitation light source configured to provide excitation radiation to a wafer bar that contains a plurality of NFTs. The NFTs have an enlarged region and a peg region having a peg height. The peg region is at least partially in contact with the enlarged region. The plurality of NFTs includes NFTs having at least two different peg heights. An optical filter is configured to substantially pass a portion of photoluminescent radiation emitted by the enlarged region in response to the excitation radiation and to substantially block the excitation radiation. A detector is configured to detect the portion of photoluminescent radiation and to output an electrical signal in response to detection of the portion of photoluminescent radiation.

Other embodiments are directed to a write head for heat-assisted magnetic recording that includes a near-field transducer. The near-field transducer has an enlarged region and a peg region that is at least partially in contact with the enlarged region. The peg region of the near-field transducer has a peg height for recording of from about 15 nm to about 30 nm. In some embodiments, the peg height is about 20 nm.

In another embodiment, a system for heat-assisted magnetic recording is disclosed that includes a recording medium and a near-field transducer that is capable of focusing energy on at least a portion of the recording medium. The near-field transducer includes an enlarged region and a peg region at least partially in contact with the enlarged region. The peg region has a peg height of from about 10 nm to about 20 nm for recording. In some embodiments, the peg height is about 15 nm.

The above summary is not intended to describe each disclosed embodiment or every implementation of the present disclosure. The drawings and the detailed description below more particularly exemplify illustrative embodiments

BRIEF DESCRIPTION OF THE DRAWINGS

Throughout the specification reference is made to the appended drawings, where like reference numerals designate like elements, and wherein.

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

Figure 1:
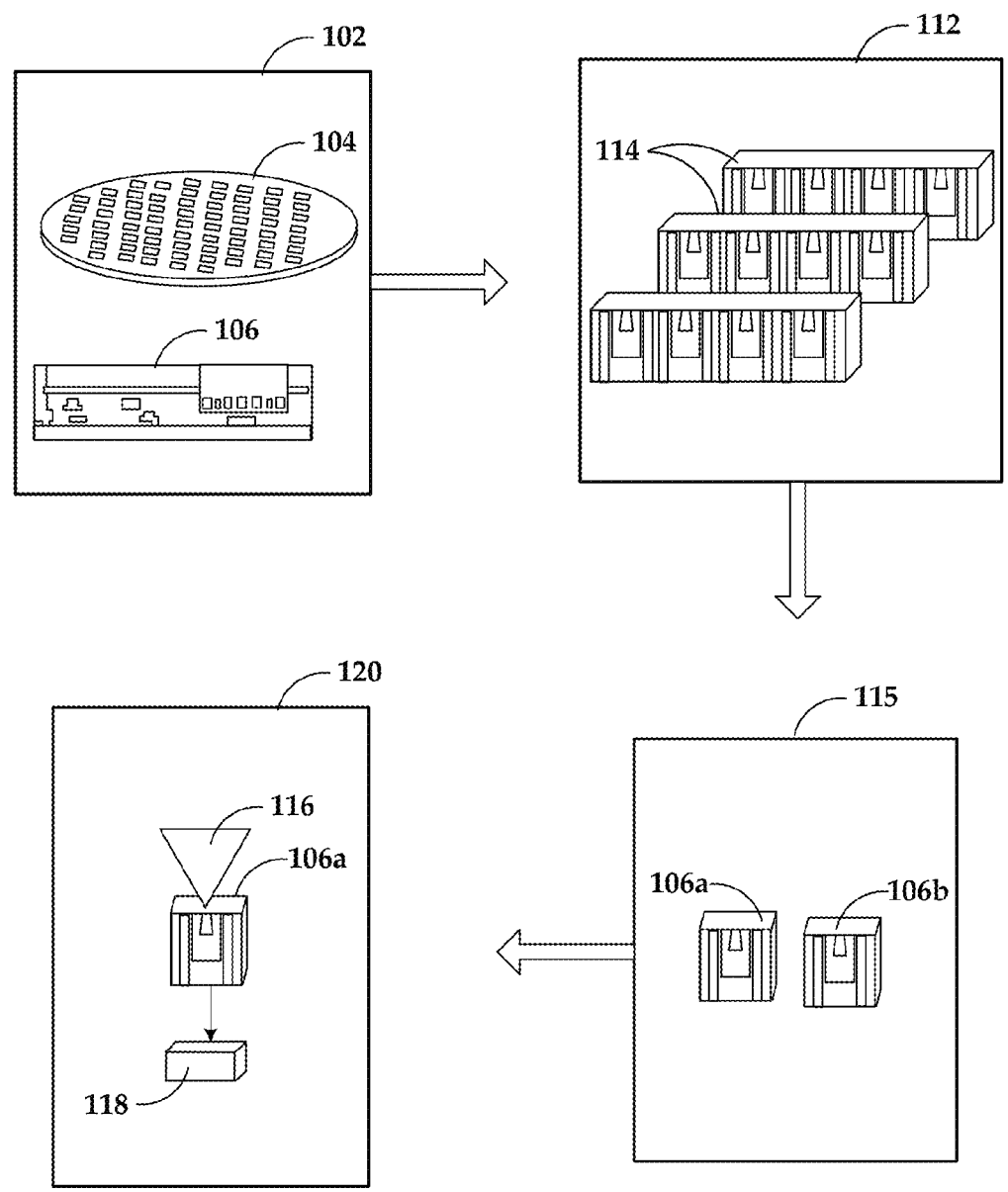
FIG. 1 shows a process flow diagram that illustrates a high-level summary of a portion of a process for fabricating a slider that may include a near-field transducer (NFT) characterization step according to the approaches discussed herein.

In the following description, reference is made to the accompanying set of drawings that form a part of the description hereof and in which are shown by way of illustration several specific embodiments. It is to be understood that other embodiments are contemplated and may be made without departing from the scope of the present disclosure. The following detailed description, therefore, is not to be taken in a limiting sense.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

The present disclosure relates to methods and systems for determining critical dimensions of near-field transducers (NFTs) that can be used in applications such as heat-assisted magnetic recording (HAMR). The NFTs include an enlarged region and a peg region at least partially in contact with the enlarged region. A HAMR device can utilize a magnetic recording media (e.g., hard disk) that can overcome superparamagnetic effects that limit the areal data density of typical magnetic media. In order to record on this media, a small portion of the media can be locally heated while being written to by a magnetic write head. A coherent light source such as a laser, e.g., laser diode, can provide the energy to create hot spots, and optical components built into a slider that houses the write head can be configured to direct this energy onto the recording medium.

When applying light to a HAMR medium, light from the light source can be concentrated into a small hotspot over the track where writing is taking place. As a result of what is known as the diffraction limit, optical components cannot be used to focus light to a dimension that is less than about half the wavelength of the light. For example, the lasers used in some HAMR designs produce light with wavelengths on the order of 800-900 nm, yet the desired hot spot can be on the order of 50 nm or less. Thus the desired hot spot size can be well below half the wavelength of the light, and, due to diffraction, optical focusers cannot be used to obtain the desired hot spot size. As a result, an optical near-field transducer (NFT) can be employed to create these small hotspots on the media.

The NFT is a near-field optics device designed to reach local surface plasmon conditions at a designed wavelength of incident light. Example NFT transducers may include a plasmonic optical antenna or a metallic aperture and a focusing element. The focusing element concentrates light on the transducer region (e.g., at the focal region) near where the optical antenna or a metallic aperture is located. Example focusing elements may include solid immersion lenses (SIL), solid immersion mirrors (SIM), and/or three-dimensional channel waveguide for light delivery to an NFT. The NFT is designed to achieve surface plasmon resonance in response to this concentration of light.

Surface plasmons are collective oscillations of surface charges that are confined to an interface between a dielectric and a metal. When surface plasmons are resonantly excited by an external optical field, the field amplitude in the vicinity of the surface may be orders of magnitude greater than that of the incident field. Moreover, the region of enhanced field may be tightly confined to a spot much smaller than the incident wavelength. At resonance, a high electric field surrounds the NFT due to the collective oscillations of electrons at the metal surface. Part of this field will tunnel into a storage medium and get absorbed, thereby raising the temperature of a spot on the media as it being recorded.

The NFT may be located near an air bearing surface (ABS) of a slider used for magnetic data storage, and may be placed in close proximity to a write head that is also part of the slider. This co-location of the NFT with the write head facilitates heating the hot spot during write operations. The focusing element, e.g., waveguide, and NFT may be formed as an integral part of the slider that houses the write head. Other optical elements, such as couplers, mirrors, prisms, etc., may also be formed integral to the slider. The optical elements used in HAMR recording heads are generally referred to as integrated optics devices.

The field of integrated optics relates to the construction of optics devices on substrates, sometimes in combination with electronic components, to produce functional systems or subsystems. For example, an integrated optics device may be built up on a substrate using layer deposition techniques. In reference now to FIG. 1, a process flow diagram illustrates a high-level, short summary of a portion of a process for fabricating a slider that includes integrated optics including an NFT and various optical coupling and/or light positioning elements. Block 102 represents a wafer-level stage. A wafer 104 is formed using semiconductor manufacturing processes (e.g., thin film deposition, chemical-mechanical polishing/planarization, etc.) and each wafer 104 generally includes a plurality of sliders (e.g., slider 106) that are later cut into bars for further processing. Each slider 106 includes an NFT subassembly comprising a waveguide focusing element and an NFT.

Block 112 represents an upstream stage where the wafer 104 has been cut into bars 114. Each bar 114 includes a plurality of sliders that are batch-processed. Stage 112 may involve attaching top bond pads (e.g., part of a slider-gimbal electrical interface). Block 115 shows that in some processes the bars are cut in to a number of individual sliders 106a, 106b prior to slider characterization.

Block 120 illustrates a characterization process for individual slider 106a. In some embodiments, the characterization process is performed at the block level before the slider block 114 is cut into individual sliders. As discussed in more detail herein, some embodiments involve characterizing the peg region and/or determining if the peg height of the NFT is suitable for effective operation based on photoluminescent radiation from the NFT. The characterization process includes providing excitation radiation from a light source 116, filtering the radiation emanating from the air bearing surface of the slider, and detecting the filtered radiation using a detector 118. The NFT, including peg region can be characterized based on the filtered radiation detected by the detector 118.

Figure 2:
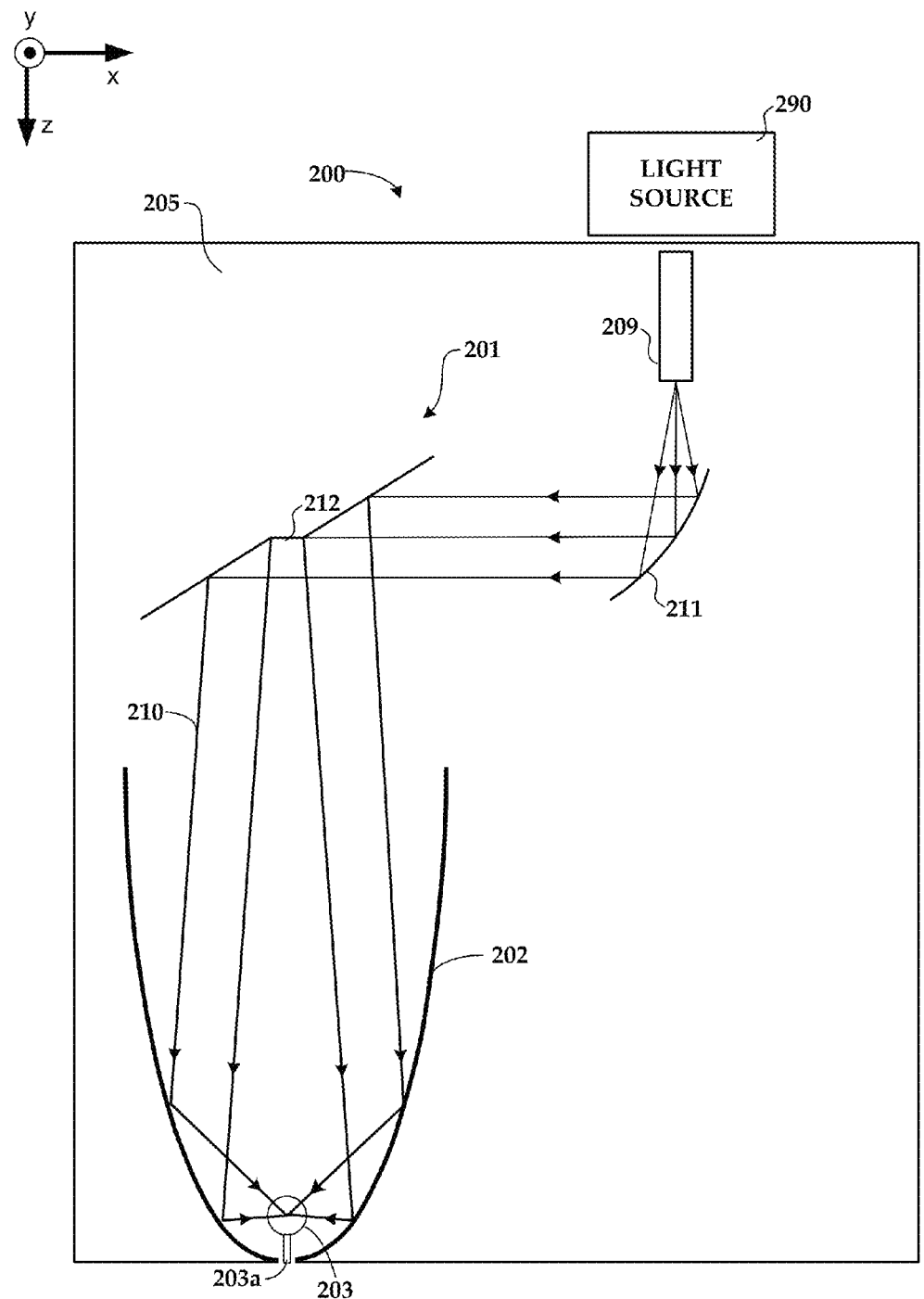
FIGS. 2, 3, 4A, and 4B provide cross-sectional diagrams that illustrate various NFT subassemblies for which the peg height of a NFT can be characterized using the approaches discussed herein.

FIG. 2 provides a cross-sectional diagram that illustrates one example of a portion of a slider that includes NFT subassembly 200. The NFT subassembly shown in FIG. 2 represents an end-fire arrangement. NFT subassembly 200 may be incorporated into a slider and optical input coupler 209 of the NFT subassembly 200 may be aligned with light-emitting device 290.

NFT subassembly 200 shown in FIG. 2 is fabricated in slider 205 and includes optical input waveguide coupler 209, first mirror 211, second mirror 212, solid immersion mirror (SIM) 202, and NFT optical antenna 203. NFT subassemblies 200 that operate by end-fire technique as shown in FIG. 2 may be incorporated into each slider 106 of bar 114 shown in FIG. 1. NFT subassembly 200 illustrates one particular configuration, although it will be appreciated that many configurations of NFT subassemblies are possible and can be characterized using the approaches discussed herein.

FIGS. 2-4B illustrate several sliders that include NFTs, wherein each NFT has an enlarged portion and a peg portion. Each of these NFTs can be characterized using the techniques disclosed herein. The operation of the NFTs is dependent in part on peg height. Thus, characterization according to the approaches discussed herein can provide information about the peg height of the NFT. In some implementations, as part of the NFT characterization, peg heights of the NFTs can be determined and/or it can be determined if the pegs have a desired peg height. In some embodiments, characterization of the peg region includes determining if the peg height meets a predetermined height and/or provides a predetermined or desired NFT response.

In the example illustrated in FIG. 2, NFT subassembly 200 receives light emitted from light source 290 via input waveguide coupler 209 which is a three-dimensional channel waveguide of finite width waveguide core. In normal use, light source 290 may comprise an edge emitting or surface emitting laser diode, for example. The light emerging from waveguide coupler 209 is directed in a solid immersion mirror (SIM), or planar solid immersion mirror (PSIM) indicated by way of SIM sidewall 202 in FIG. 2, by first mirror 211 and second mirror 212. NFT 203 (a lollipop-type NFT with a circular cross-section and peg) is located at the focus point of SIM 202.

Figure 3:
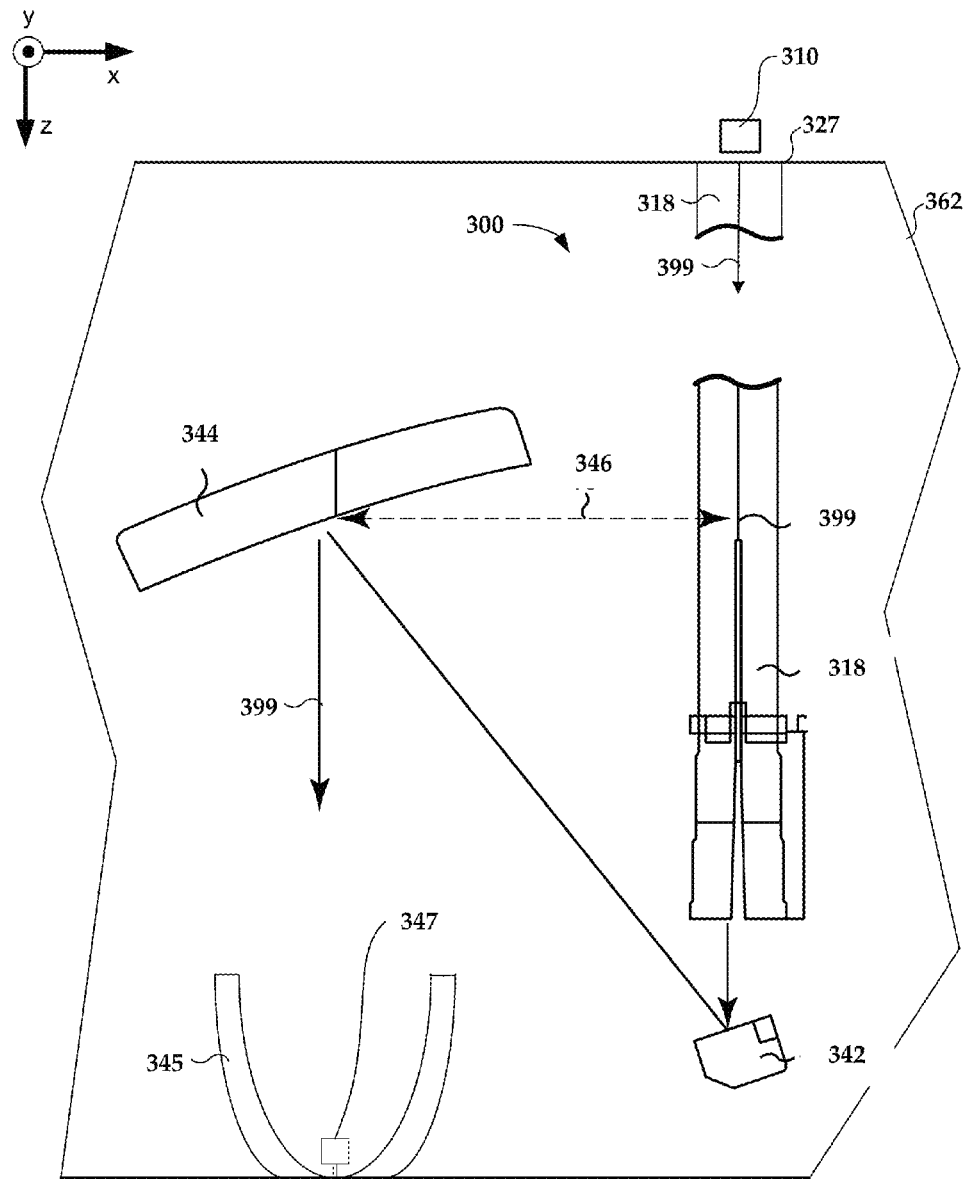

NFT 203 shown in FIG. 2 comprises a "lollipop" configuration that combines a circular enlarged disk region with a peg region, although other configurations, such as a square enlarged region such as that illustrated in FIG. 3, may be used. The lollipop dimensions are selected to function as an antenna for the incident light, to resonate at the excitation wavelength, and to transfer energy into the peg and thus to the medium via the feedgap at tip 203a of NFT 203. The NFT is a transducer that can be made of any plasmonic material (e.g., Au, Ag, Cu, or ZrN) and may be positioned at or near the focal region of light 210.

Waveguide core 201 may be formed from any material that has a higher index of refraction than cladding. For example, waveguide core 201 may be made from $Ta_2O_5$, $TiO_2$, ZnS, or SiN. The PSIM 202 may be formed as a parabolic cutout of surrounding dielectric waveguide material (e.g., $Al_2O_3$, $SiO_2$, $SiO_xN_y$, MgO, $HfO_2$, $Y_2O_3$, $Ta_2O_5$, or $TiO_x$). The cutout may be formed from/coated with a reflective material (e.g., Au, Al), so that light rays 210 entering PSIM 202 by way of waveguide core 201 are focused to a focal region to strongly couple to NFT 203 and generate surface plasmons.

FIG. 3 shows another configuration for NFT subassembly 300 that may be incorporated into a slider. NFT subassembly 300 may be incorporated into a slider and the optical input coupler 318 of NFT subassembly 300 may be aligned with light-emitting device 310. FIG. 3 shows light source 310 positioned at mounting surface 327 of slider 362. In the configuration of FIG. 3, the light delivery path includes three mirrors, two directional mirrors 342, 344 and the SIM 345. NFT 347 is offset from waveguide input coupler 318 along the x axis by distance 346, e.g., about 102 micrometers (µm). Light path 399 passes through waveguide input coupler 318 to first reflecting mirror 342. Light reflected by mirror 342 encounters second reflecting mirror 344 which redirects light 399 toward SIM 345 which focuses the light on the NFT 347.

Figure 4A:
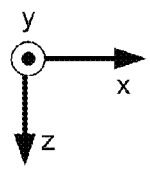
Figure 4A:
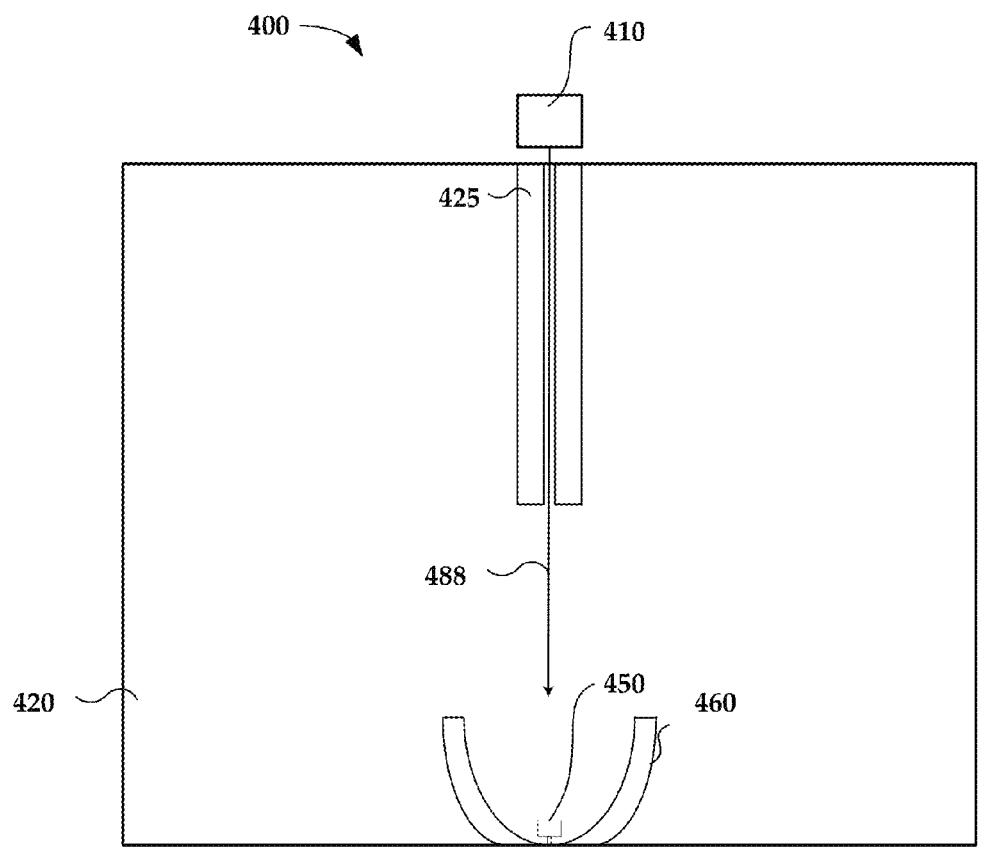

FIG. 4A illustrates NFT subassembly 400 that has a straight through light path. NFT subassembly 400 may be incorporated into slider 420 and optical input coupler 425 of NFT subassembly 400 may be aligned with light-emitting device 410.

In this configuration, waveguide input coupler 425 couples light into light delivery path 488 within slider 420. Light from light source 410 is coupled into light delivery path 488 through optical input coupler 425, which comprises a waveguide. Optical input coupler 425 carries light to SIM 460 which focuses the light onto NFT 450.

Figure 4B:
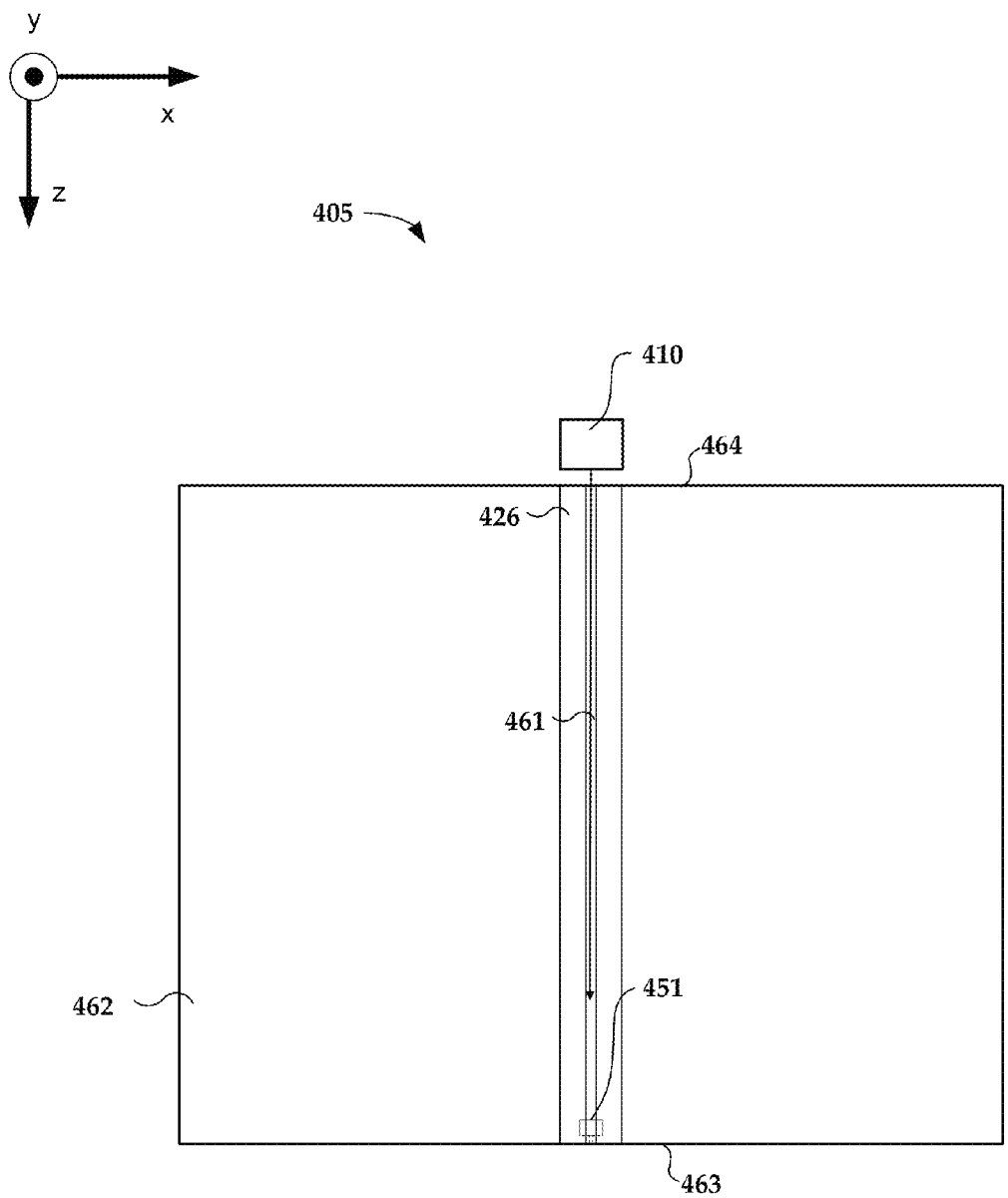

FIG. 4B illustrates NFT subassembly 405 that has a straight through light path and does not have a SIM. NFT subassembly 405 may be incorporated into slider 462 and optical input coupler 426 of NFT subassembly 405 can be aligned with light-emitting device 410.

In this configuration, optical input coupler 426 couples light into light delivery path 461 within slider 420. As shown in this example, optical input coupler 426 may be a waveguide that extends toward NFT 451 and is configured to carry the light that couples in from light-emitting device 410 to NFT 451. In various configurations, waveguide 426 extends at least a majority of the distance between slider surface 464 and air bearing surface (ABS) 463 and may extend the entire distance. FIG. 4B shows waveguide 426 that extends the entire distance between surface 464 and ABS 463. NFT 451 could be placed in a waveguide cladding layer, e.g., a cladding layer between the NFT and magnetic write pole, or NFT 451 could be positioned within the waveguide 426 at or near the end of waveguide. A SIM is not included in the embodiment illustrated in FIG. 4B.

Dark field microscopy has been attempted to characterize optical antennas by measuring the light scattering from NFT, however this characterization technique may not be applicable in the presence of an incident beam ("bright field") in actual devices. Dark field microscopy may also not be very sensitive to the peg height. The peg height of the NFT can influence the NFT recording performance. Characterization of the NFT by the thermo-reflectance pump/probe method, for example, measures optical changes due to absorption of the NFT, however, the pump/probe method can suffer from variation due to the thermal environment. Some characterization methods are less sensitive to certain parameters that are useful to track in a manufacturing environment.

According to some embodiments discussed herein, characterization of the NFT subassemblies may be accomplished by sensing filtered photoluminescent radiation emitted by the NFT in response to high energy excitation radiation. The photoluminescent radiation is strongly enhanced by the local surface plasmons that are generated at the NFT surface. The photoluminescent radiation generated in the NFT includes wavelengths shorter than the excitation radiation by two-photon excitation. Two-photon luminescence is luminescence excited by two-photon absorption. Two-photon induced photoluminescence in noble metals such as gold and silver is generally considered as a three-step process. Electrons from occupied d bands are first excited by two-photon absorption to unoccupied states of the sp-conduction band. Second, subsequent intra-band scattering processes move the electrons closer to the Fermi level. Third, the relaxation of the electron-hole pair recombines either through non-radiative processes or by emission of luminescence. The emission of luminescence is proportional to $E^4$, where E denotes the electric-field amplitude. Local surface plasmons at the surface of the NFT enhance the luminescence significantly.

In various configurations, the characterization system includes shortwave pass spectral filters, notch filters and/or beam splitters with a wavelength edge that are used to separate the bright field light (e.g., the excitation light) from the photoluminescent light emanating from the NFT.

An example subsystem for characterizing NFT subassemblies in accordance with some embodiments is described with reference to FIGS. 5 and 6A-6C. Excitation light source 501 emits excitation radiation 503 that passes through focusing lens 505 and illuminates slider 511 comprising an optical input coupler and an NFT. FIG. 6A provides an exemplary spectral distribution of the focused excitation radiation 506 that is centered at wavelength $\lambda_E$. The spectral distribution diagrams of FIGS. 6A-C are idealized as Gaussian distributions of arbitrary peak magnitudes, however, it will be appreciated that, in general, the distributions need not be Gaussian. In response to excitation radiation 506, the NFT in slider 511 emits white light super-continuum photoluminescence 512 at the feedgap and tip of the optical antenna (e.g., see, 203a, FIG. 2). A portion of excitation radiation 506 that is not absorbed in the NFT is also transmitted through slider 511.

An exemplary spectral distribution of electromagnetic radiation 512 emerging from the NFT of slider 511 that includes both a photoluminescent radiation component 513 and excitation radiation component 506 is shown in FIG. 6B. In this example, the photoluminescent radiation component 513 is shown as having an arbitrary peak or central wavelength, $\lambda_L$, and excitation radiation component 506 is shown as having an arbitrary peak or central wavelength, $\lambda_E$. Although the idealized spectral distributions and magnitudes of FIGS. 6A-6C do not necessarily correspond to actual spectral distributions and magnitudes of the photoluminescent and excitation radiation, FIG. 6C illustrates that photoluminescent radiation 613 emitted by the NFT includes shorter wave radiation and/or has shorter peak or central wave when compared to excitation radiation 606.

Radiation 512 that emerges from the NFT of slider 511 is collected and collimated by lens 516 and passes through shortwave pass filter 520 having cutoff wavelength, $\lambda_F$. Shortwave pass filter 520 substantially removes components of radiation 512 having a wave longer than $\lambda_F$. As such, shortwave pass filter 520 substantially absorbs or blocks excitation radiation component 506 and also absorbs or blocks that portion of the photoluminescent radiation that has wavelength greater than $\lambda_F$. The shortwave pass filter substantially passes wavelengths of the photoluminescent radiation with wavelengths greater than $\lambda_F$, including radiation 525 shown in FIG. 6C.

Returning now to FIG. 5, filtered radiation 525 impinges on detector 530, such as a photomultiplier tube (PMT) or a solid state photodetector. Photodetector 530 provides electrical signal output 535 in response to incident filtered radiation 525 that can be used to measure the filtered photoluminescent radiation emitted by the NFT.

Figure 7:
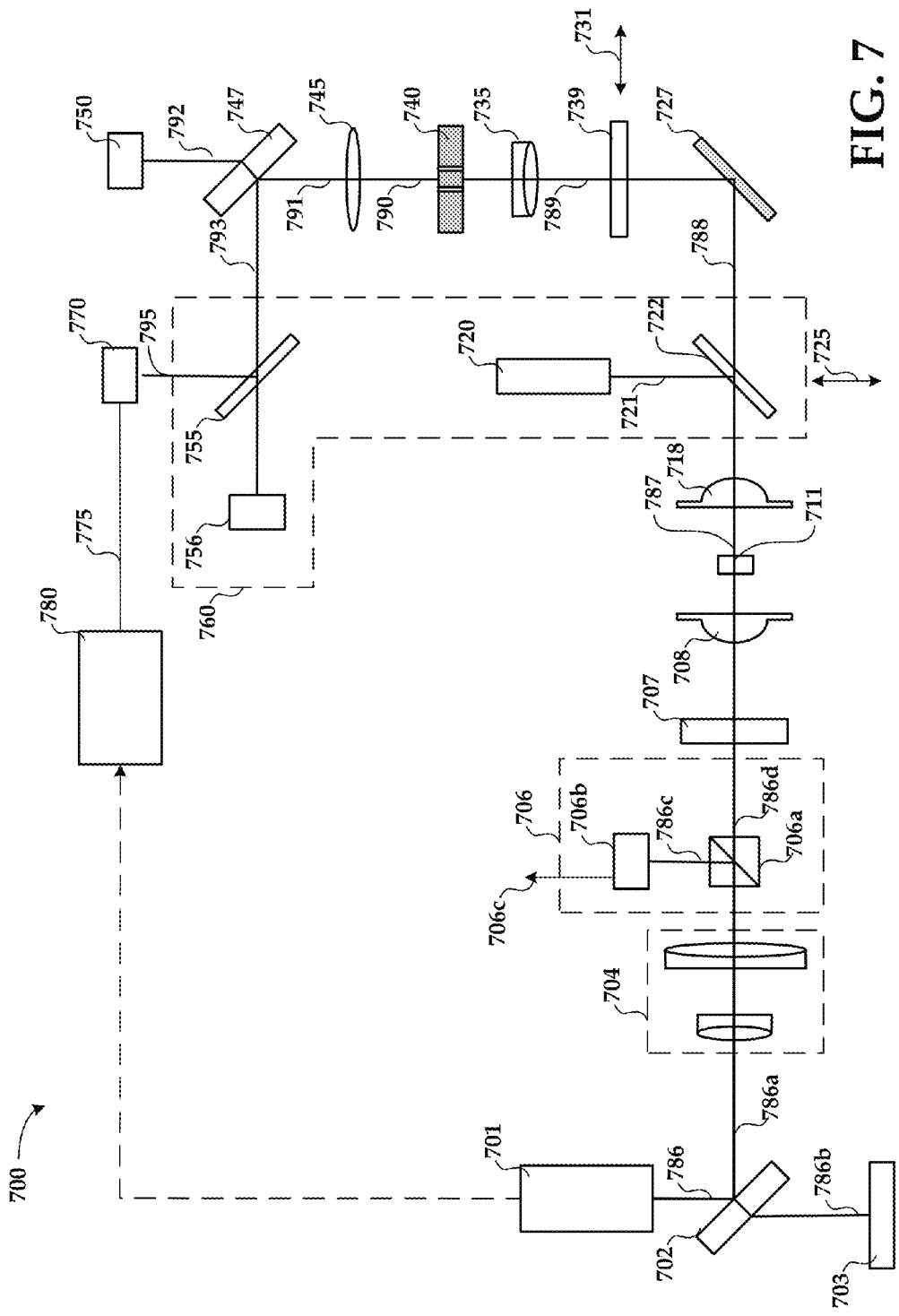
FIG. 7 is a block diagram of a characterization system according to various embodiments.

FIG. 7 shows an embodiment of a subsystem 700 suitable for use in characterizing NFTs in accordance with some embodiments. As with the system of FIG. 5, the system of FIG. 7 also involves detecting photoluminescent light emanating from the NFT in response to excitation radiation and filtering using a shortwave pass filter.

As shown in FIG. 7, high energy excitation radiation is provided by mode-locked femtosecond or picosecond laser 701, e.g., a Ti:sapphire laser emitting 160 femto second pulses at a repetition rate of 76 MHz and having a wavelength of about 805 nm±10 nm. In some cases, it may be desirable to reduce the intensity of the excitation light 786 that is incident on the NFT subassembly under test. In these cases, a beam sampler may be used to pass a portion of the excitation light to a beam dump. As illustrated in FIG. 7, the excitation light 786 emitted by laser 701 reflects from optional Fresnel beam sampler 702. Portion 786b of the excitation radiation is transmitted through Fresnel sampler 702 to beam dump 703. Another portion 786a of the excitation radiation is directed toward optional beam expander 704 that expands the beam of excitation radiation 786a emitted by the laser. In some cases, system 700, optionally, includes subsystem 706 configured to monitor excitation radiation 786a at the output of beam expander 704. Optional excitation radiation monitor 706, can include, for example, neutral, non-polarizing beam splitter cube 706a that splits off sample 786c of excitation radiation 786a and directs sample radiation 786c to photodetector 706b. Photodetector 706b generates signal 706c in response to the incident sample radiation 786c.

Excitation radiation 786d passes through achromatic half-wavelength waveplate 707 that can rotate the polarization direction of radiation 786d to the desired direction for NFT excitation. Excitation radiation 786d is focused by focusing lens 708 onto the input waveguide coupler (or grating coupler) in subassembly 711 being tested. For example, a suitable lens for lens 708 is an aspherical lens that has a numerical aperture (NA) of about 0.25. In some test setups, NFT subassembly 711 being tested is disposed on a bar that includes many NFT subassemblies. In response to excitation radiation 786d, NFT subassembly 711 being tested emits photoluminescent radiation and also a portion of the excitation radiation is transmitted through NFT subassembly 711. Thus, radiation 787 emanating from NFT subassembly 711 is a combination of the photoluminescent radiation and the excitation radiation, as previously discussed.

Combined radiation 787 output from NFT subassembly 711 under test is collimated and collected by lens 718 of high numerical aperture, e.g., NA of about 0.90. To image the radiation exiting surface of NFT subassembly 711, system 700 may include imaging subsystem 760. The imaging subsystem includes fiber bundle white light source 720 that provides white light 721 for imaging NFT subassembly 711. White light 721 is coupled into light beam 788 by broadband mirror 722. Arrow 725 indicates that components of the imaging subsystem, e.g., white light source 720 and mirror 722 may be used for set up and then removed from the beam path. Radiation 788 includes excitation radiation transmitted through NFT subassembly 711, and includes photoluminescent radiation emitted by the NFT subassembly in response to the excitation radiation. In some configurations, imaging system 760 is used to position NFT subassembly 711. In these configurations, white light 721 generated by white light source 720 will not be a component of radiation 788 when the photoluminescence of NFT subassembly 711 is being measured.

Figure 8:
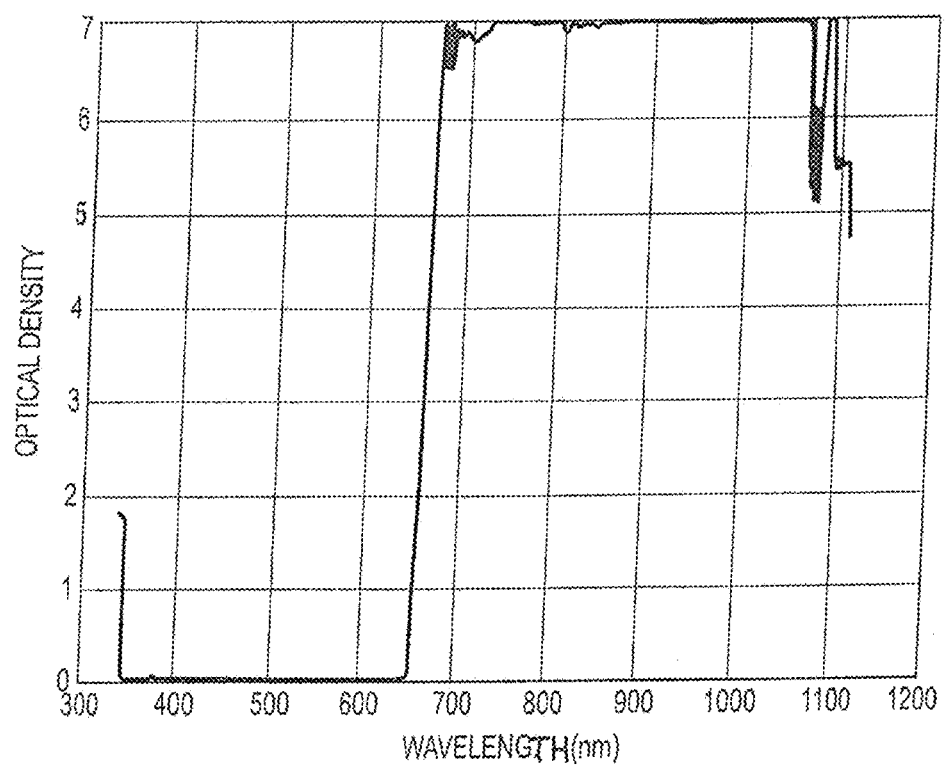
FIG. 8 shows a possible spectral characteristic for the shortwave pass filter used in the system of FIG. 7.

Radiation 788 can be redirected through mirror 727 and through shortwave pass spectral filter 739. Shortwave pass filter 739 substantially blocks (absorbs) the excitation radiation and substantially passes a portion of the photoluminescent radiation emitted by the NFT. FIG. 8 shows a possible spectral characteristic for filter 739. A filter having the characteristics of FIG. 8 has an optical density of $10^{-7}$ and blocks transmission by a factor of about $10^{-7}$ or by about $10^{-4}$, for example, in the wavelength range longer than the cut-off wavelength (which is 650 nm in FIG. 8), where the excitation radiation (e.g., 805 nm±10 nm) is located. In contrast, the filter shown in FIG. 8 substantially passes radiation (has an optical density close to 0 or 100% transmission) in the wavelength range from about 320 nm to about 650 nm. Arrow 731 indicates that the filter 739 may be moved out of the radiation path during measurement of the transmitted excitation radiation.

Figure 9:
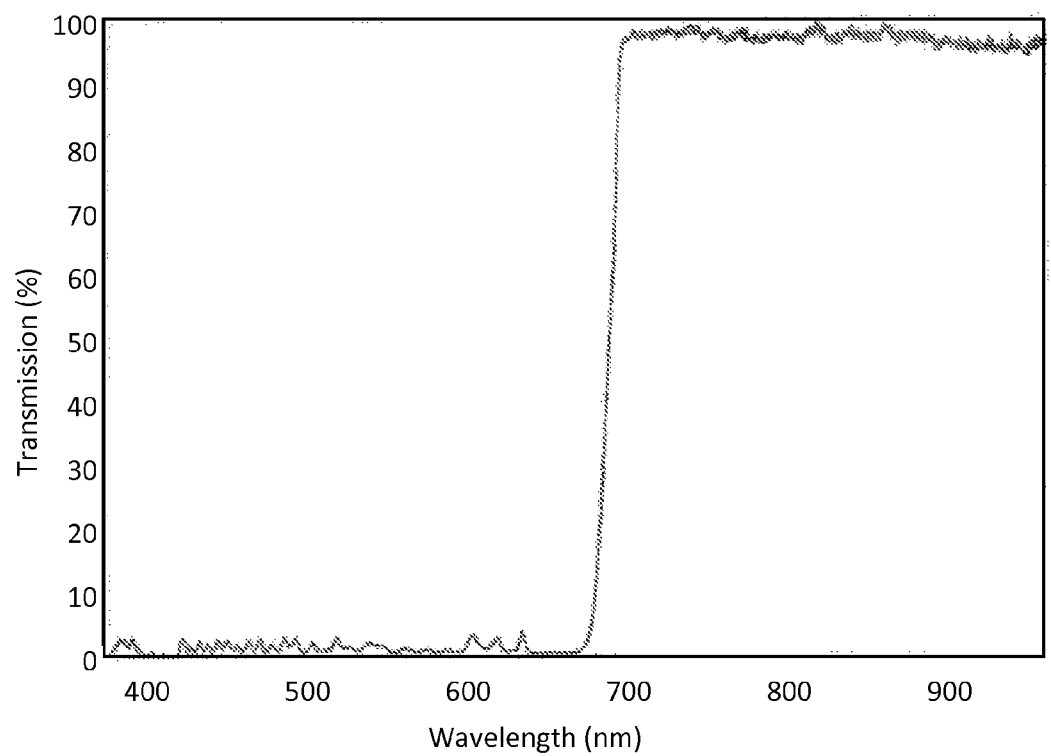
FIG. 9 shows a possible spectral characteristic of a suitable dichroic beam splitter used in the system of FIG. 7.

After filter 739, a confocal detection scheme is used. Radiation 789 that passes through filter 739 subsequently passes through non-coated or broad-band coated plano-convex imaging lens 735 or a doublet. Iris diaphragm or slit 740 is placed near the focal point of imaging lens 735 to reduce the background noise. Radiation 790 that passes through the iris diaphragm or slit 740 is imaged by biconvex lens 745 and through dichroic beam splitter 747. Dichroic beam splitter 747 has a 685 nm edge that separates incoming radiation 791 into two spectrally distinct beams. Any radiation with wavelength above the 685 nm edge is transmitted, whereas radiation with wavelength below the 685 nm edge is reflected. The spectral characteristic of a suitable dichroic beam splitter is shown in FIG. 9. Incoming radiation 791 is separated by dichroic beam splitter 747 into first radiation beam 792 with wavelength greater than 685 nm and second radiation beam 793 with wavelength less than 685 nm. Shortwave pass filter 739 in combination with dichroic beam splitter 747 reject the excitation radiation wavelengths from second radiation beam 793 by a factor of about $10^{-7}$, or about $10^{-10}$ or even about $10^{-14}$.

First radiation beam 792 is directed to photodetector 750 configured to measure the excitation radiation transmitted through an NFT subassembly. Second radiation beam 793 comprises the components from the photoluminescence from NFT under test 711 and light from the white light source 720 that was reflected by NFT bar 714. Optical element 755 directs the photoluminescent radiation to both or either of PMT 770 and CCD 756. Optical element 755 is on a translation stage and may be a beam splitter or moveable mirror. If optical element 755 is a moveable mirror, the moveable mirror directs the luminescence to PMT 770 or to CCD 756. If optical element 755 is a beam splitter, optical element directs the luminescence to both the PMT 770 and CCD 756. With the white light moved in the light path and without the presence of shortwave pass filter 739 in the light path, the light transmitted through a device, including the NFT radiation, and white light 794 reflected from a device is imaged onto a cooled charge coupled device (CCD) that is a part of imaging subsystem 760; with the white light moved out of the light path and shortwave pass filter 739 moved into the light path, the two-photon induced photoluminence from NFT is either directed to PMT 770 or CCD 756 if 755 is a mirror, or, is split into both PMT 770 and CCD 756 if 755 is a beam splitter. The photoluminescence image of slider 711 can be viewed using the CCD without the presence of white light radiation and with the presence of shortwave pass filter. White light source 720 is removed from the optical path to measure photoluminescence (imaging and detection).

The photoluminescence 795 is detected by detector 770, e.g., photomultiplier tube (PMT) or other type of detector. In response to photoluminescence 795, detector 770 generates electrical signal 775 that is based on the amount of radiation incident on detector 770. In some cases, the system may include unit 780 configured to facilitate discerning a weak signal from a noisy background to enhance the signal to noise ratio of electrical signal 775. In some cases, the SNR is enhanced by amplifying electrical signal 775 using a lock-in amplifier that is locked to the repetition frequency of the laser pulses. In some embodiments, unit 780 may employ a photo-counting technique that uses an appropriate threshold to trigger the photon counting of photoluminescence 795 by the detector 770.

Figure 5:
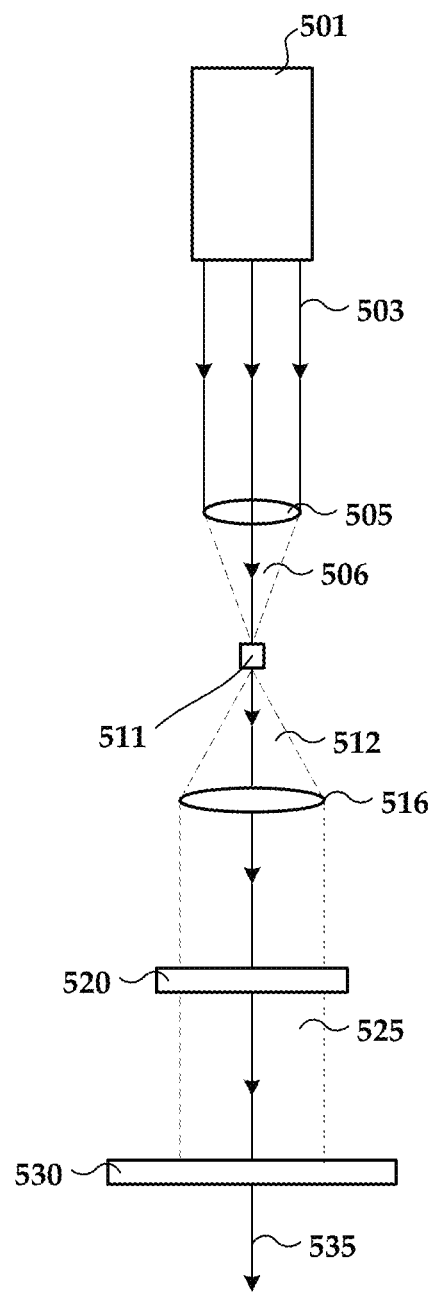
FIG. 5 depicts a characterization subassembly that may be used to determine the peg height in accordance with some embodiments.
Figure 6A:
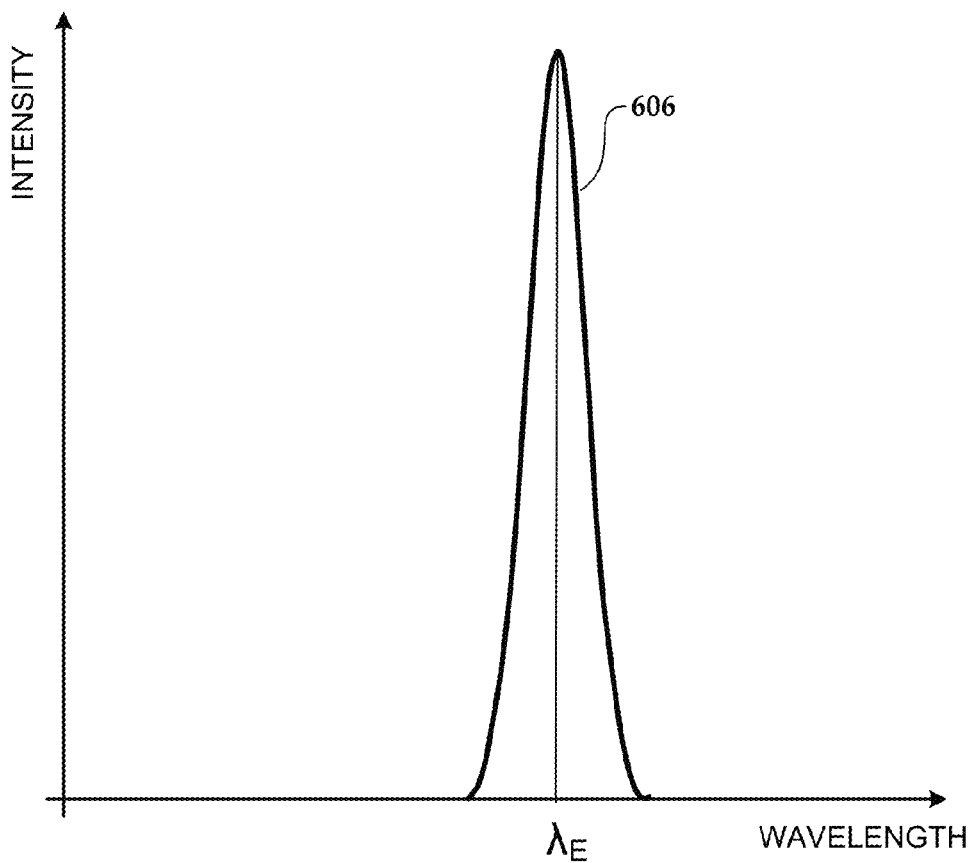
FIG. 6A provides an example spectral characteristic of the excitation radiation for the systems of FIG. 3.
Figure 6B:
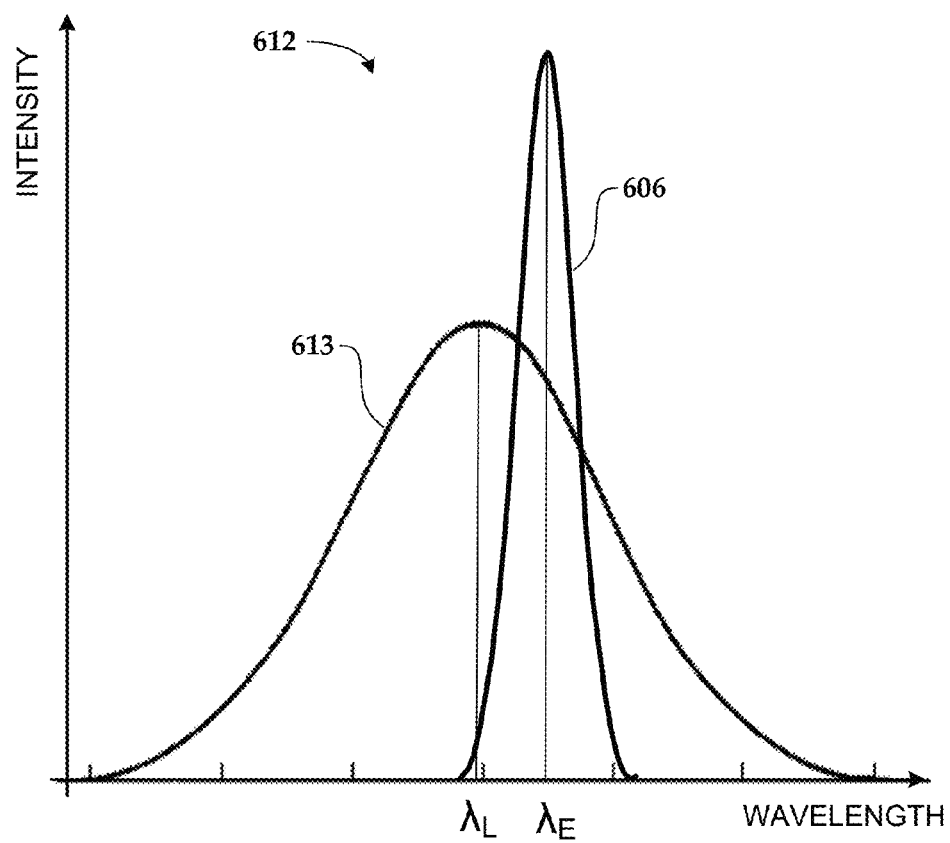
FIG. 6B provides an example spectral characteristic of photoluminescent radiation emitted by an NFT in response to the excitation radiation.
Figure 6C:
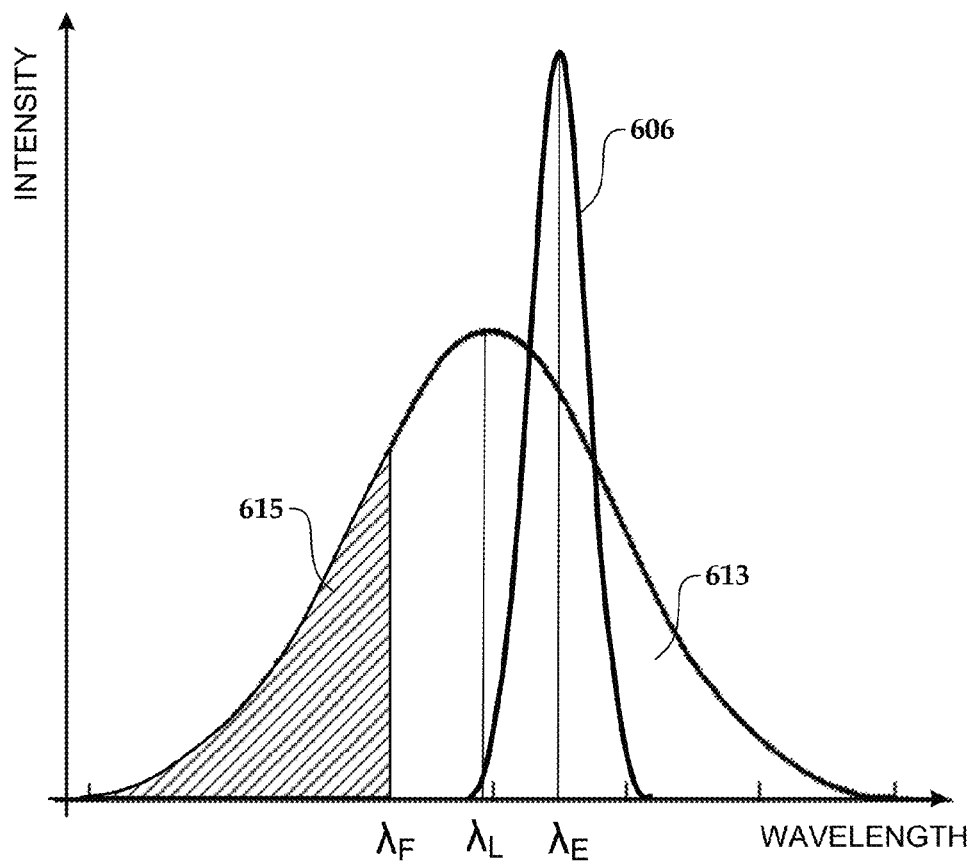
FIG. 6C illustrates shortwave pass filtered radiation that is used to characterize the NFT under test in accordance with various embodiments.
Figure 10:
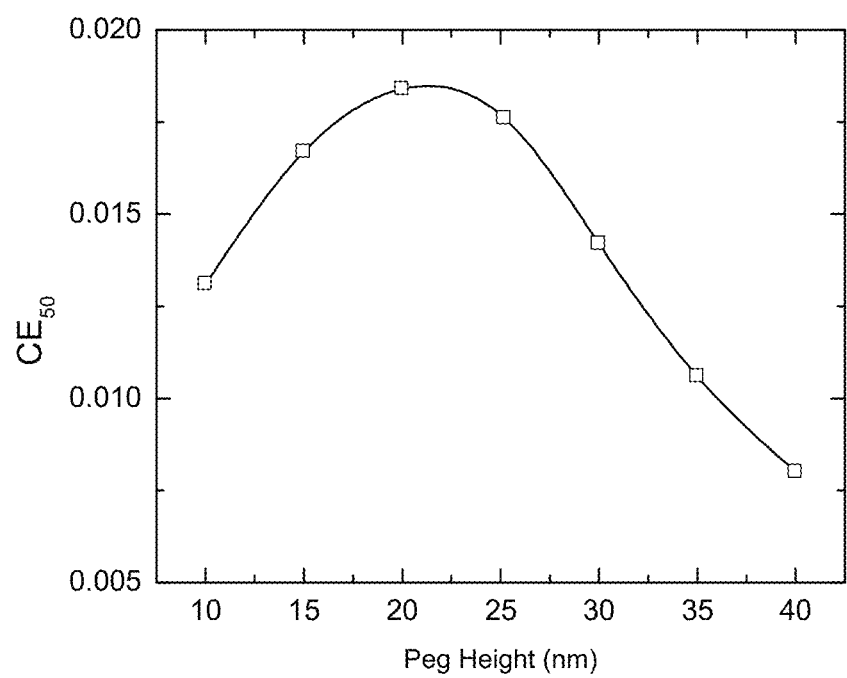
FIG. 10 is a graph based upon modeling showing the relationship between $CE_{50}$ (light absorption in a medium of a 50 nm×50 nm footprint) and peg height in nm.

The characterization subsystems illustrated in FIGS. 5 and 7 can be used to characterize NFT performance, particularly with regard to peg height. Peg height (used interchangeably with peg length herein) of near-field transducers is related to HAMR head recording performance as are other parameters such as thermal gradient, thermal spot size, near-field transducer efficiency, and head reliability. Peg heights that provide efficient NFT performance are related to the dimension and shape of the near-field transducer, the surrounding dielectric material for the near-field transducer, and the wavelength of excitation. FIG. 10 is a graph based upon modeling showing the relationship between $CE_{50}$ (light absorption in a medium of a 50 nm×50 nm footprint) and peg height in nm. The modeled near-field transducer had a peg thickness of 30 nm and an enlarged disk region having a diameter of 250 nm. When the excitation wavelength is 830 nm and the dielectric material surrounding the near-field transducer is alumina, pegs having heights of between about 17 nm and 28 nm absorbed a maximum amount of light energy when a recording media was present as shown in FIG. 10.

Figure 11:
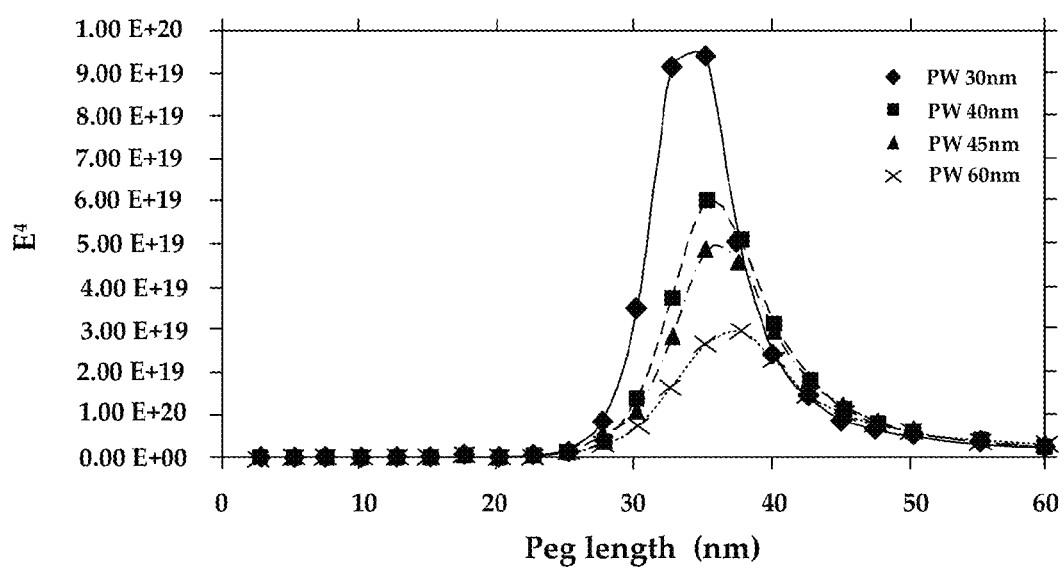
FIG. 11 shows a modeled response of the integrated electric field, E, over the near-field transducer as a function of peg height, in nm, measured from the break point where the peg meets the edge of the enlarged disk region and the tip of the peg.

FIG. 11 shows a modeled response of the integrated electric field, E, over the near-field transducer as a function of peg height, in nm, measured from the break point where the peg meets the edge of the enlarged disk region and the tip of the peg. This response was obtained without the presence of a recording medium, in contrast to that displayed in FIG. 10. The two-photon excited photoluminescence (TPPL) is proportional to $E^4$. FIG. 11 shows the response of electric field ($E^4$) as a function of peg height (in nm) for pegs having various widths (30 nm, 40 nm, 45 nm, and 60 nm). A suitable peg height can be around 35 nm to 38 nm and NFT response only varies slightly as a function of peg width. However, the value of peg height modeled without media is shifted about 10 nm-15 nm from the modeled result shown in FIG. 10 with media present. Additionally, it has been found that the optimal peg height is only slightly affected by the diameter of the enlarged disk area of lollipop NFTs.

Figure 12:
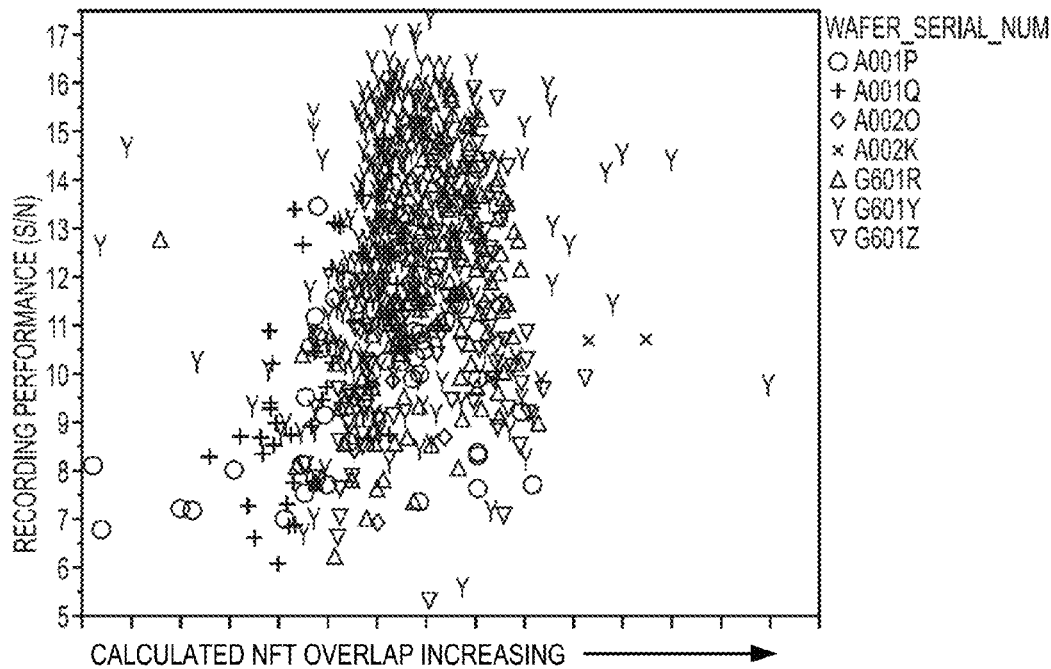
FIG. 12 is a plot of recording performance (measured in signal-to-noise ratio) as a function of calculated NFT overlap (related to peg height) for various lots of wafer bars containing NFTs with different peg heights.
Figure 13:
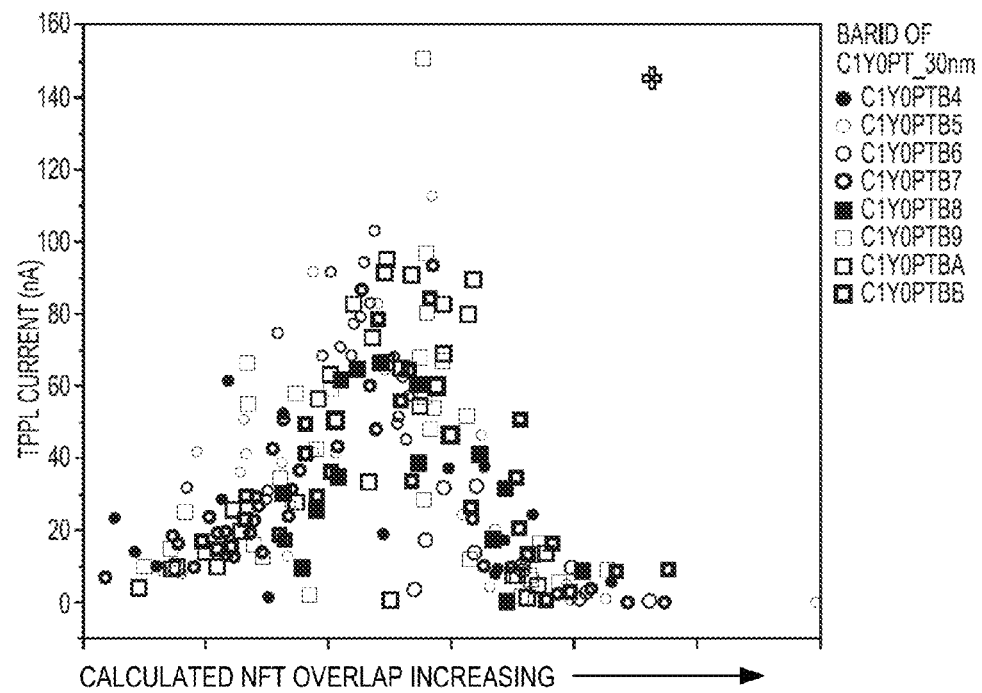
FIG. 13 is graph of two-photon photoluminescence (TPPL) signal (nA) as a function of calculated NFT overlap for various lots of wafer bars containing NFTs with different peg heights.

FIG. 12 is a plot of recording performance (measured in signal-to-noise ratio) as a function of calculated NFT overlap (related to peg height) for various lots of wafer bars containing NFTs with different peg heights. The calculated NFT overlap was computed using an electrical lapping guide when the slider was lapped. There is typically an offset between the actual peg height and the calculated NFT overlap depending upon the type of wafer, the size of the enlarged disk, and the bar lapping. The data presented in FIG. 12 was obtained from NFTs that were excited by 830 nm light. FIG. 12 shows that there is a dependence of signal-to-noise ratio (S/N) on peg height (NFT overlap). NFT overlap can be positive, negative or zero. The NFT overlap is zero when the peg has been fully lapped away from the NFT. A positive NFT overlap indicates an overlapped peg (lapped beyond the peg/enlarged disk break point) so that there is no peg present in the NFT. FIGS. 12 and 13 show recording performance and TPPL current, respectively, as a function NFT overlap for NFT overlaps increasing from a negative NFT overlap (peg present) to a positive NFT overlap (no peg present).

FIG. 13 is graph of two-photon photoluminescence (TPPL) signal (nA) as a function of calculated NFT overlap for exciting the NFT with 830 nm light with an incident laser power of 150 µW. Shown are different lots of wafer bars (from the same lot) containing NFTs that have been subjected to 30 nm slope lapping. On resonance, the signal is greater than 100 nA; off resonance the signal is less than about 10 nA. FIG. 13 shows that there is a dependency of TPPL current on peg height (NFT overlap). The data in FIG. 12 and FIG. 13 show that TPPL current necessarily is also a function of recording performance and that both of these parameters are affected by peg height in lollipop NFTs.

Figure 14:
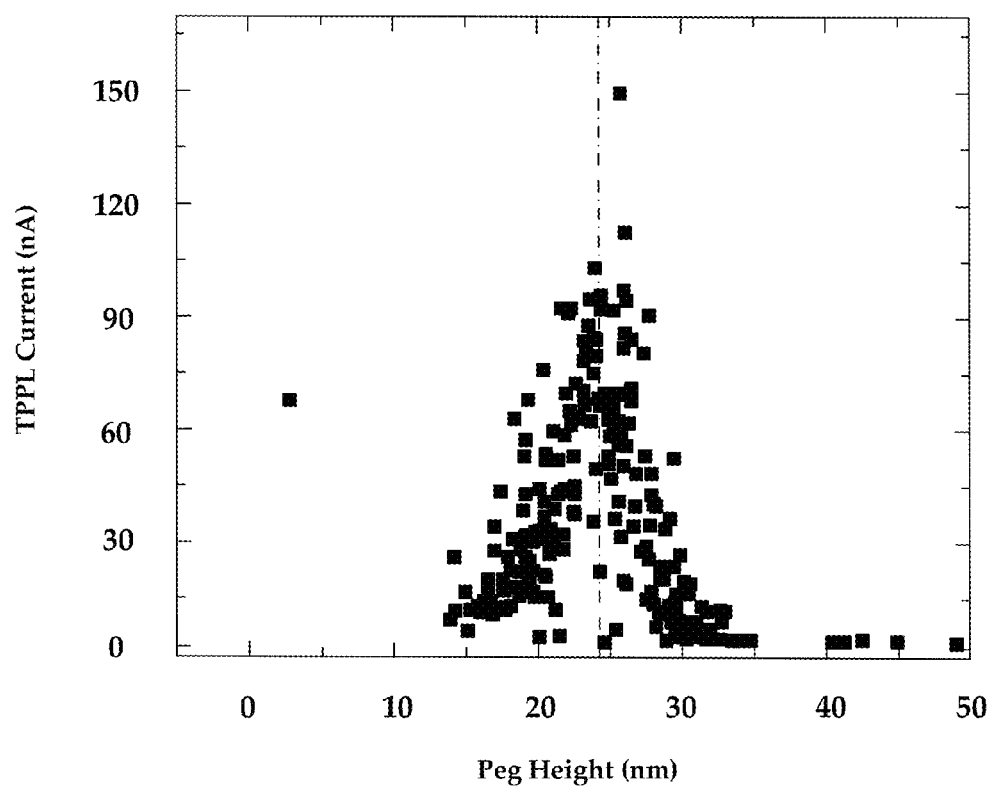
FIG. 14 is a plot of TPPL current (nA) vs. peg height (nm) for embodied NFTs.
Figure 15:
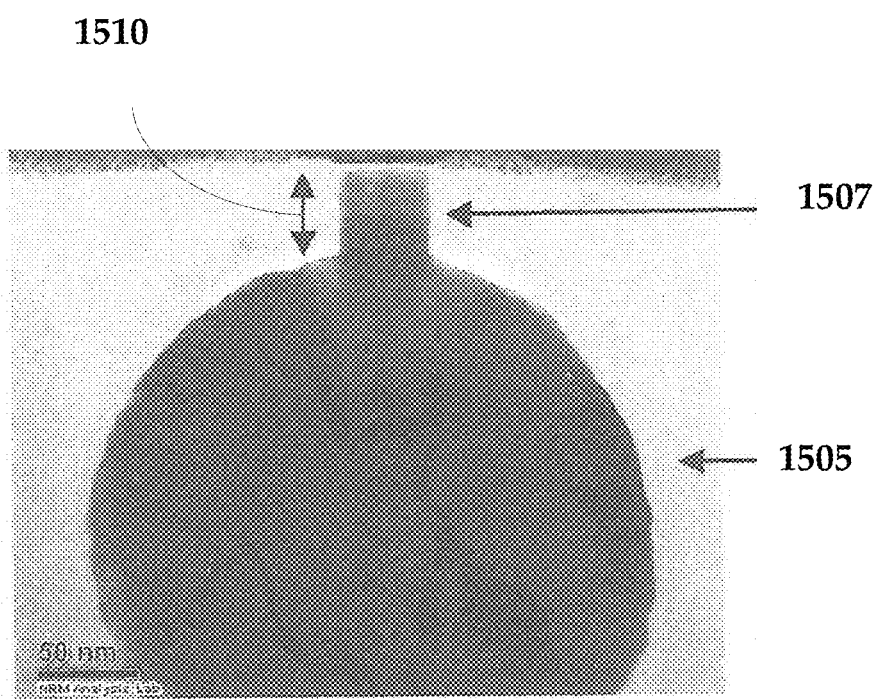
FIG. 15 is a transmission electron micrograph (TEM) of one of the embodied NFTs.

FIG. 14 is a plot of TPPL current at resonance vs. peg height (nm). The peg height was calibrated using cross-sectional TEM on some of the NFTs. An example of a TEM is shown in FIG. 15. The lollipop NFT in FIG. 15 includes enlarged disk region 1505 and peg region 1507. Peg height 1510 is determined from the TEM image. The data in FIG. 14 show that a peg height (e.g., optimum, measured using TPPL which is related to recording performance) is from about 20 nm to about 30 nm, from about 18 nm to about 28 nm, or even about 25 nm. This value may not be affected very much by enlarged disk diameter or peg width as discussed above. A suitable peg height of about 25 nm is for pegs in lollipop NFTs that have no media present. In the present disclosure, optimum peg height refers to a peg height or peg heights that are within 25%, are within 10%, are within 5%, are within 2%, or are within 1% of the maximum peg height (measured using a slope bar, for example) determined by the maximum photoluminescent signal using the characterization method described above.

Based upon the data presented in FIGS. 10 and 11, there is about a 10-15 nm shift (red shift) in the optimum peg height when media is present. Based upon this data, a suitable peg height of a lollipop NFT is from about 20 nm to about 30 nm or about 25 nm with no media present and should be from about 10 nm to about 20 nm or about 15 nm in a HAMR write head with media present.

Figure 16:
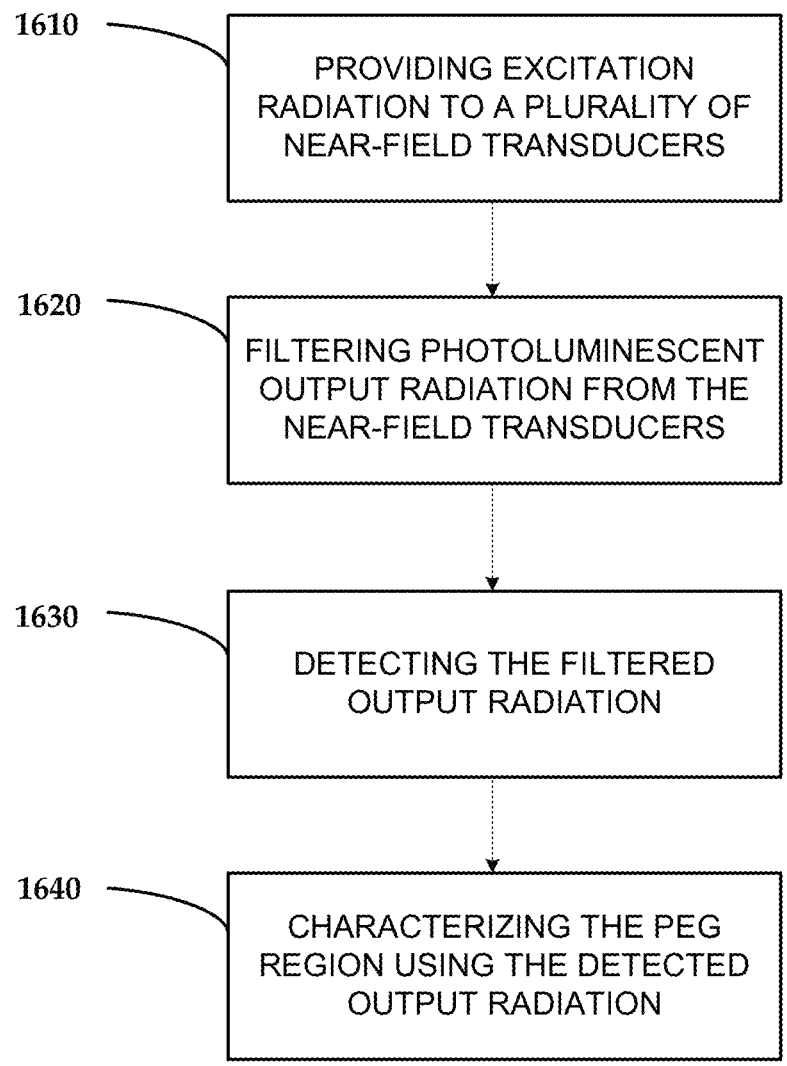
FIG. 16 is a flow diagram of a method of characterizing the peg region of an NFT.

FIG. 16 is a flow diagram of a method for characterizing the peg region of an NFT. Excitation radiation is provided 1610 to one or more NFTs disposed in one or more sliders. In some implementations, the excitation radiation source may be aligned with a waveguide input coupler of an NFT before the characterization of the peg region of the NFT occurs. The excitation radiation is configured to excite the NFTs to emit photoluminescent radiation. Excitation radiation that is not absorbed by the slider and/or NFT emanates from the air bearing surface (ABS) of the slider along with the photoluminescent radiation. The radiation emanating from the ABS is filtered 1620 using a low pass filter that substantially passes the photoluminescent radiation. The filtered radiation is detected 1630 and the peg region is characterized 1640 using the detected radiation.

Figure 17:
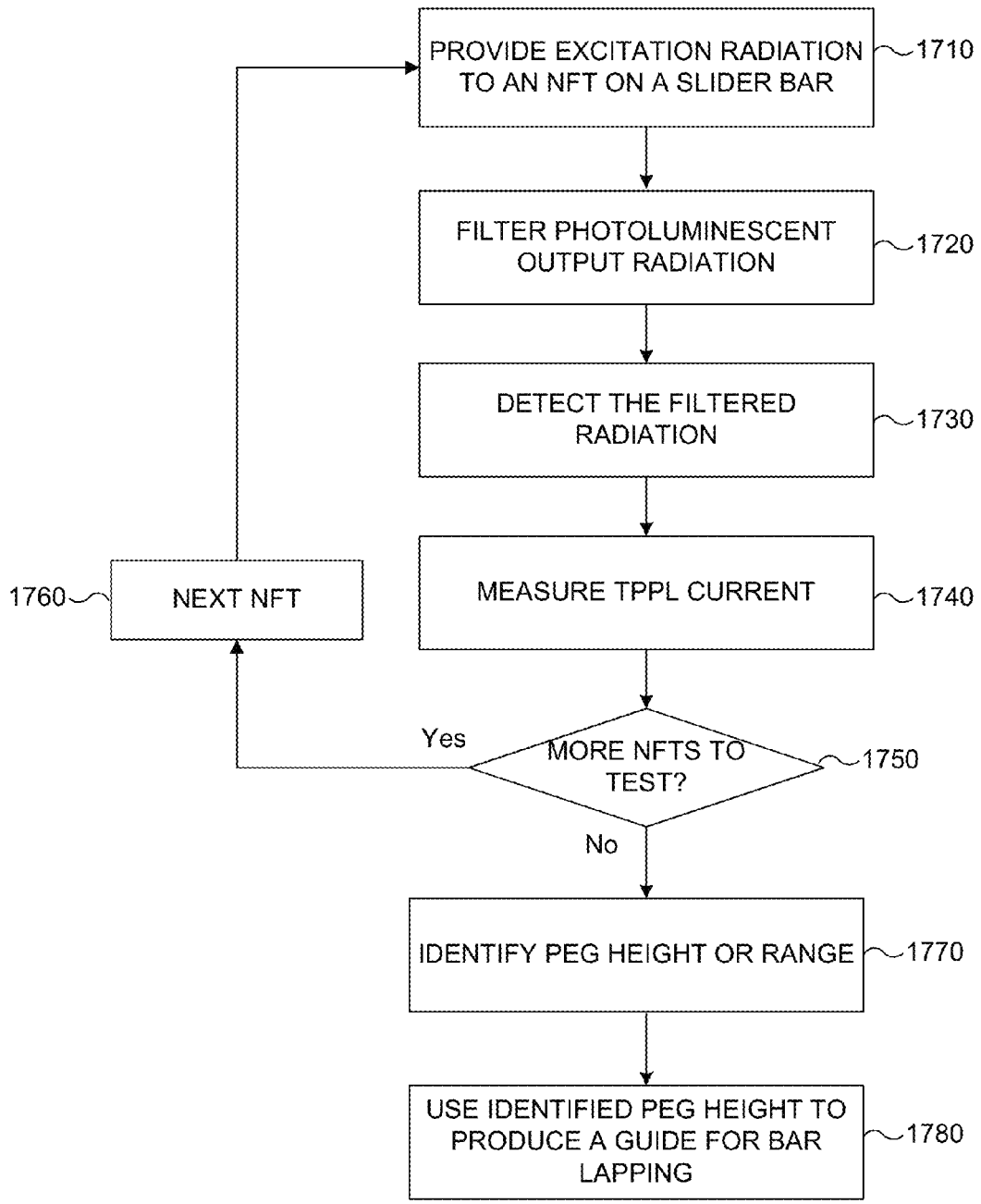
FIG. 17 is a flow diagram of identifying a peg height that provides acceptable NFT performance and using the identified peg height to fabricate NFTs.

Some embodiments involve processes used to make sliders having a specified peg height based on characterization of the peg region using TPPL techniques as discussed herein. A process for fabrication of sliders is illustrated by the flow diagram of FIG. 17. A bar of sliders having multiple NFTs can be slope lapped or otherwise formed so that the bar includes NFTs having a number of different peg heights. In some implementations, the slope lapping may produce peg heights from 0 to 50 nm, or any other convenient range, for example. Excitation radiation is provided 1710 to an NFT disposed on the slider bar. The excitation radiation is configured to excite the NFTs to emit photoluminescent radiation. Excitation radiation that is not absorbed by the slider and/or NFT emanates from the air bearing surface (ABS) of the slider along with the photoluminescent radiation. The radiation emanating from the ABS is filtered 1720 using a low pass filter that substantially passes the photoluminescent radiation. The filtered TPPL radiation is detected 1730. The TPPL current produced by the detector is measured 1740. If there are more 1750 sliders on the bar to be tested, the process 1710-1740 is repeated 1760 for the next NFT until the NFTs have been characterized. For example, characterization of number of NFTs of differing heights may produce TPPL measurement data similar in form to the graph of FIG. 14. A peg height that provides a specified NFT performance is identified from the measurement data.

The identified peg height may be any peg height that provides NFT performance within an acceptable performance range. In some scenarios, the identified peg height identified may be the peg height that provides optimal NFT performance based on the peak value of the measured TPPL current with respect to peg height. In some scenarios, a peg height is identified from a range of peg heights that provide NFT performance (as indicated by measured TPPL current) within a specified range, e.g., +/−1%, +/−2%, +/−5%, +/−10 or +/−25% of the optimum NFT performance. The identified peg height is used to produce a fabrication guide, e.g., electric lapping guide, used for lapping slider bars to provide sliders having NFTs with the identified peg height.

Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof.

What is claimed is:

1. A write head for a heat-assisted magnetic recording medium, comprising:
   a near-field transducer comprising an enlarged disk region and a peg region at least partially in contact with the enlarged region, the peg region having peg height from about 15 nm to about 30 nm.

2. The write head of claim 1, wherein the peg region has a peg height of from about 18 nm to about 28 nm.

3. The write head of claim 1, wherein the peg region has a peg height of about 25 nm.

4. The write head of claim 1, wherein the enlarged disk region has a diameter of about 250 nm.

5. The write head of claim 1, wherein the near-field transducer is configured for an excitation wavelength of 830 nm.

6. The write head of claim 1, further comprising a waveguide that delivers light from a light source to the near-field transducer.

7. The write head of claim 6, further comprising a solid immersion mirror that focuses light from the waveguide onto the near-field transducer.

8. The write head of claim 6, wherein the waveguide comprises a straight path from the light source to the near-field transducer.

9. The write head of claim 1, wherein the near-field transducer is formed of gold.

10. A write head for a heat-assisted magnetic recording medium, comprising:
    a light source;
    a waveguide optically coupled to the light source; and
    a near-field transducer coupled to the waveguide, the near-field transducer comprising an enlarged disk region and a peg region at least partially in contact with the enlarged region, the peg region having peg height from about 15 nm to about 30 nm.

11. The write head of claim 10, wherein the peg region has a peg height of from about 18 nm to about 28 nm.

12. The write head of claim 10, wherein the peg region has a peg height of about 25 nm.

13. The write head of claim 10, wherein the enlarged disk region has a diameter of about 250 nm.

14. The write head of claim 10, wherein the near-field transducer is configured for an excitation wavelength of 830 nm.

15. The write head of claim 10, further comprising a solid immersion mirror that focuses light from the waveguide onto the near-field transducer.

16. The write head of claim 10, wherein the waveguide comprises a straight path from the light source to the near-field transducer.

17. The write head of claim 10, wherein the near-field transducer is formed of gold.

18. A write head for a heat-assisted magnetic recording medium, comprising:
- a near-field transducer comprising:
  - means for receiving light and resonating at an excitation frequency; and
  - a peg region having peg height from about 15 nm to about 30 nm and configured to receive energy resulting from the resonating at the excitation frequency and transfer the energy to a recording medium.

19. The write head of claim 18, further comprising means for directing the light onto the means for receiving the light.

20. The write head of claim 19, further comprising means for generating the light, the light being received by the means for directing the light.

* * * * *